United States Patent [19]

Sotome et al.

[11] 4,419,912

[45] Dec. 13, 1983

[54] VIBRATION THREADING LATHE FOR PRECISION SCREW CUTTING

[75] Inventors: Tatuo Sotome, Hiratsuka; Fumio Yokoi, Isehara, both of Japan

[73] Assignees: Pilot Man-Nen-Hitsu Kabushiki Kaisha, Tokyo; Yugen Kaisha Shindo Sessaku Kenkyusho, Kofu, both of Japan

[21] Appl. No.: 274,356

[22] Filed: Jun. 16, 1981

[30] Foreign Application Priority Data

Jun. 24, 1980 [JP] Japan .................................. 55-85494

[51] Int. Cl.³ .............................................. B23B 5/24
[52] U.S. Cl. ........................................ 82/5; 82/14 R; 82/DIG. 9
[58] Field of Search ..................... 82/5, 14 R, DIG. 9

[56] References Cited

U.S. PATENT DOCUMENTS 3,516,138  6/1970  McCarroll .......................... 82/14 R 4,143,564  3/1979  De Biasse ........................... 82/14 R

FOREIGN PATENT DOCUMENTS 54-11586   1/1979  Japan ............................. 82/DIG. 9
55-144902 11/1980  Japan ............................. 82/DIG. 9

Primary Examiner—W. D. Bray
Attorney, Agent, or Firm—Wenderoth, Lind & Ponack

[57] ABSTRACT

A vibration threading lathe has a cutting tool vibrated by an ultrasonic vibrator and supported by a tiltable frame which is so tiltable that the cutting tool can be inclined at the lead angle of the screw thread. As a result, screw cutting can be accomplished with remarkably low resistance to cutting, without burrs, and with a remarkably low rate of abrasive wear of the cutting tip. This lathe is highly suitable for threading articles of difficult-to-machine materials such as stainless steel, titanium, and beryllium copper, and particularly tubular articles of small diameters and having thin walls.

8 Claims, 11 Drawing Figures

VIBRATION THREADING LATHE FOR PRECISION SCREW CUTTING

BACKGROUND OF THE INVENTION

This invention relates generally to screw cutting lathes and more particularly to a vibration threading lathe for cutting precision screw threads which is capable of cutting screw threads with excellent machining efficiency on difficult-to-cut materials such as stainless steel, titanium, and beryllium copper by vibration threading wherein a pulsive cutting force waveform is utilized.

In the case of machining screw threads with a cutting tool on the surface of a difficult-to-cut material such as stainless steel, titanium, or beryllium copper such as, for example, a stainless-steel material of cylindrical shape of an outer diameter of 10 mm or less and a thin wall of 0.5 mm or less, according to known machining practice, the cutting tip of the cutting tool will be worn after machining a number of workpieces on the order of 40 to 50 pieces, and it will be necessary to replace the cutting tip. Furthermore, in order to finish to specific dimensions, 7 to 8 cuts will be required. Thus, such a machining operation has heretofore been inefficient.

In general, furthermore, even under machining conditions by which machining of screw threads is possible with a single cut, it has heretofore been necessary always to carry out a finish cut of the order to at least zero to a number of tens of microns after rough machining for reasons such as dimensional stability and shape precision.

Still another difficulty is that, in ordinary conventional machining in the case where, for example, screw threads of M=30 and P=1.5 are formed with a single cut on stainless steel, the principal force component of the resistance to cutting is of a great magnitude e.g. approximately 230 kg. In order to withstand this large resistance, the driving mechanisms of the cross slide holding the cutting tool and the longitudinal feed carriage or saddle as well as the tool rest or mechanism fixing the cutting tool must be made to have high strength and rigidity. As a consequence, the related structural parts or the entire machine must unavoidably be made bulky and strong.

SUMMARY OF THE INVENTION

It is an object of this invention to provide a vibration threading lathe for cutting precision screw threads which is capable of cutting positively and accurately, with one screw cutting cycle, threads of specific shape and dimensions on hard-to-cut materials, and in which, at the same time, the serviceable life of the cutting tool is remarkably prolonged.

Another object of the invention is to provide a vibration machining lathe for cutting precision screw threads in which the size and rigidity of the saddle, cross slide, and the mechanism for fixedly holding the cutting tool as well as the required driving power for the main spindle can be reduced, and the entire lathe can be made light and small in size.

Still another object of this invention is to provide a lathe of the above stated character in which the cross slide for holding the cutting tool is driven by air pressure, whereby its driving mechanism can be made light and is not required to have a great rigidity.

A further object of the invention is to provide a lathe of the above stated character in which a control mechanism of the cam following type comprising cams and cam styluses for controlling the movements of the cutting tool relative to the workpiece, that is, the movement toward the workpiece, the clearing movement therefrom after machining, and retraction therefrom, is small and has a simple construction.

A further object of the invention is to provide a lathe of the above stated character in which, in comparison with a conventional lathe, less rigidity of the main spindle and less force for gripping the workpiece are required, yet which is capable of machining with low out-of-roundness and excellent dimensional stability.

An additional object of the invention is to provide a lathe of the above stated character in which a tubular workpiece can be fixedly secured to the main spindle with a single control manipulation, and, at the same time, screw cutting without the formation of burrs can be accomplished on the inner and outer surfaces of the workpiece.

According to this invention, briefly summarized, there is provided a vibration threading lathe for precision screw cutting in which workpiece blanks are singly fed by a blank feeding device to a chuck so as to be held thereby at one end of a main spindle for driving the chuck in rotation, and precision screw cutting is performed on each blank by means of a cutting tool mounted on a tool rest supported on a traveling carriage assembly, the movements of which are controlled by a carriage control device, in which lathe:

the blank feeding device feeds the blanks one-by-one through the hollow interior of the main spindle;

the traveling carriage assembly comprises a saddle which, in interlocked motion with the rotation of the main spindle, travels in the axial direction of the main spindle at a speed in accordance with the pitch of the screw threads being cut and a cross slide for traveling perpendicularly to the travel direction of the saddle;

the tool rest is mounted on the cross slide and is provided with a tiltable frame for supporting the cutting tool, which tiltable frame is mounted on the tool rest in an adjustable position relative to the tool rest, thereby being capable of varying the position of the cutting tip of the cutting tool; and a vibrator is provided on the cross slide and is coupled to the cutting tool thereby to cause the cutting tool to vibrate during the screw cutting operation thereof.

The nature, utility, and further features of this invention will be more clearly apparent from the following detailed description with respect to a preferred embodiment of the invention when read in conjunction with the accompanying drawings, briefly described below.

Figure 1:
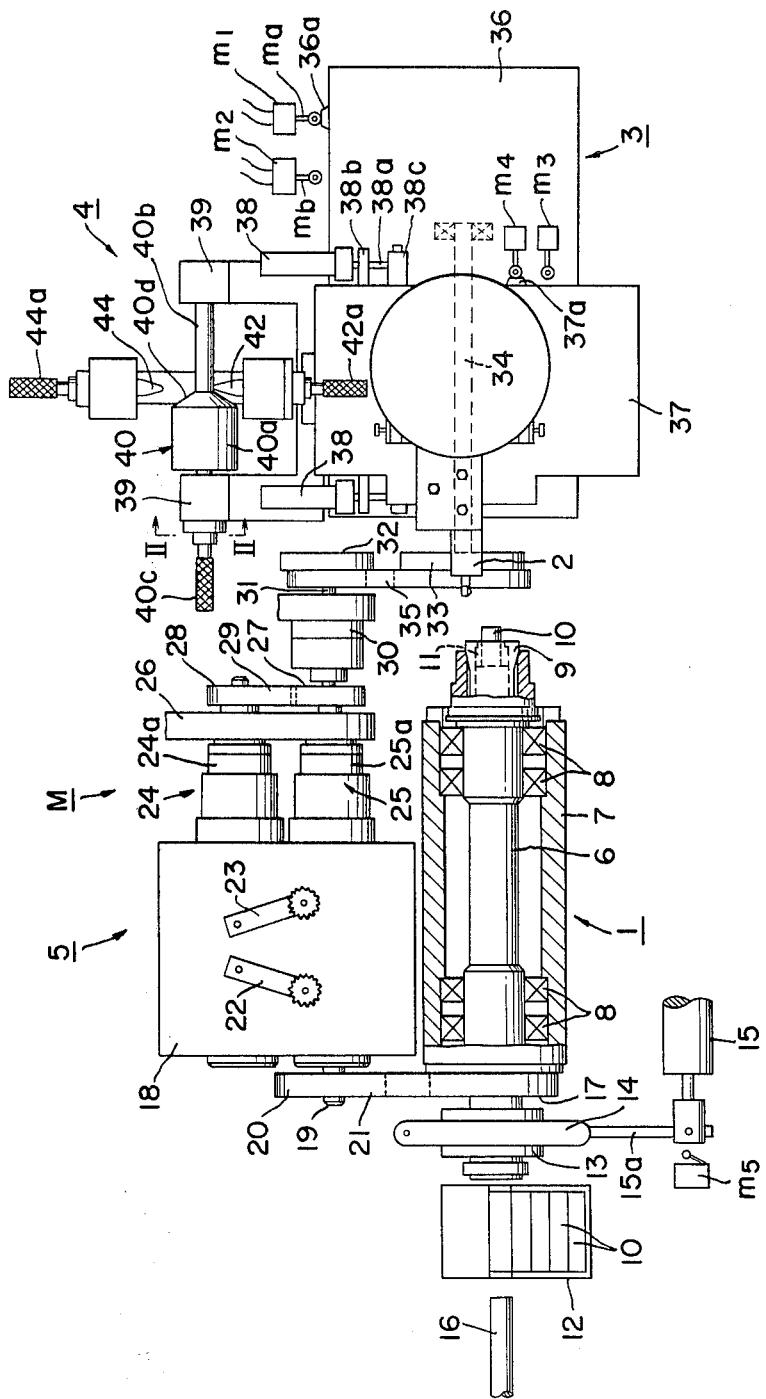
FIG. 1 is a plan view, with some parts in horizontal section, of one example of the lathe according to this invention.

Throughout this disclosure "left" and "right" directions are those as viewed in FIG. 1, while "front" and "rear" or "back" directions are respectively those toward the lower and upper parts of FIG. 1. The "longitudinal" direction is that coincident with or parallel to the axis of the main spindle of the lathe.

DETAILED DESCRIPTION OF THE INVENTION

Referring to FIG. 1, the vibration threading lathe M for precision screw cutting of this invention has a spindle stock assembly 1 for holding and rotating a workpiece (blank material) such as, for example, the barrel of a fountain pen, a traveling carriage assembly 3 disposed to confront this spindle stock assembly 1 on the right side thereof and holding a cutting tool 2, a carriage control device 4 for controlling the traveling movements of the traveling carriage assembly 3, and a gear control device 5 for controlling the travel of a longitudinal feed slide or saddle described hereinafter.

The above described spindle stock assembly has a main spindle 6 rotatably supported by bearings 8 within a main spindle support 7 and rotated by a driving motor (not shown). This main spindle 6 is of tubular shape and supports at its spindle nose a collet chuck 9 mounted thereon. Within this collet chuck 9, a workpiece 10 is so held that its outer or right-hand end projects slightly forward and out of the chuck. In the case where the workpiece has a tubular shape with a thin wall, the collet chuck 9 is provided therewithin with a C-shaped ring 11, by which the workpiece 10 is held in coaxial relation to the main spindle 6.

Blank material constituting the workpieces 10 are supplied into a magazine or chute 12 provided on the left-hand side of the spindle stock assembly 1. When a new blank 10 is to be loaded into positon for machining, the lowermost blank 10 in this chute 12 is pushed through the hollow interior of the main spindle 6 by a push rod 16, adapted to undergo reciprocating movement in coaxial alignment with the main spindle, and is thus loaded into position within the collet chuck 9. Thus, the workpiece blanks 10 in the chute 12 are fed one at a time, and the push rod 16 and chute 12 form a blank feeding device.

A collet chuck actuating cylinder 13 is provided at the left end part of the main spindle 6 and is held around its peripheral surface by a holding member 14. This holding member 14 is coupled to the piston rod of an air cylinder 15 aligned parallelly with main spindle 6 and is thereby actuated to cause the collet chuck actuating cylinder 13 to slide in the axial direction of the main spindle thereby to actuate the collet chuck 9 in an opening and closing action. While not shown, a known mechanism is provided to intercouple the acutating cylinder 13 and the collet chuck 9. There is provided a microswitch $m_5$ adjacent to the left end of the piston rod of the cylinder 15.

A pulley 17 is fixed to the main spindle 6 at a position close to the collet chuck actuating cylinder 13. An endless timing belt 21 is passed around this pulley 17 and a pulley 20 fixed to an input shaft 19 extending out from one end of a gear box 18 of the aforementioned gear control device 5. The gear box 18 houses and supports a gear mechanism comprising various gears and which is adjusted by the turning of levers 22 and 23, which are mounted on the upper face of the gear box 18.

The gear mechanism within the gear box 18 has two output shafts 24 and 25, the rotational speeds of which can be selected at will by adjusting the gear mechanism thereby to vary the traveling speed of the longitudinal feed slide or saddle 36, described hereinafter, in accordance with the selected pitch of the screw threads to be cut on the workpiece.

The two output shafts 24 and 25 of the gear box 18 are rotatably supported near their outer end by a support plate 26. On the output shaft 24 is mounted a clutch 24a for cutting feed (forward rotation clutch) for causing the saddle to travel toward the left for screw cutting. One the other output shaft 25 is mounted a return clutch 25a (reverse rotation clutch) for returning the saddle to its original position upon completion of the cutting.

Pulleys 28 and 27 are respectively fixed to the right ends of the output shafts 24 and 25 and are coupled by an endless transmitting belt 29 fitted therearound. To the pulley 26 is coupled an electromagnetic brake 30, to the output shaft 31 of which is fixed a first two-step pulley 32. In correspondence with this first two-step pulley 32, a second two-step pulley 33 is fixed to one end of a longitudinal feed screw 34 for causing the saddle to travel in the longitudinal direction. An endless transmitting belt 35 is passed in a selectively shiftable manner around these two two-step pulleys 32 and 33. By shifting the position of this transmitting belt on the pulleys 32 and 33, the feed speed of the longitudinal feed slide can be varied.

The aforementioned traveling carriage assembly 3 has the aforementioned saddle 36 slidably mounted thereon for sliding in the direction of the axis of the main spindle 6 and a cross slide 37 for sliding on the saddle 36 in the direction perpendicular to the axis of the main spindle. The saddle 36 is caused to undergo reciprocating travel in the longitudinal direction by the above described longitudinal feed screw 34 when it rotates. The cross slide 37 is actuated to slide in the transverse direction by the piston rods 38a of air cylinders 38 provided on the left and right sides of the cross slide.

The air cylinders 38 are fixedly mounted on the saddle 36, and their piston rods 38a are passed through guide projections 38b and connect to projections 38c formed to project outward on the left and right walls of the cross slide 37.

Figure 2:
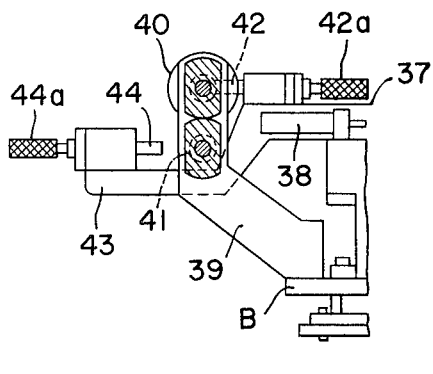
FIG. 2 is an elevational section taken along the plane indicated by line II—II in FIG. 1 as viewed in the arrow direction of the arrows.

The carriage control device 4 provided adjacent to the traveling carriage assembly 3 has upper and lower copying cams 40 and 41 supported between support arms 39 spaced apart left and right and extending rearward from a fixed structure B as shown in FIG. 2. The upper cam 40 comprises a large-diameter part 40a and a small-diameter part 40b. The lower cam 41 has a diameter equal to the small-diameter part 40b of the upper cam 40.

A cam follower or stylus 42 for cooperating with the upper cam 40 is mounted on the rear end of the cross slide 37. A cam stylus 44 for cooperating with the lower cam 41 is mounted on the rear end of a projecting arm 43 extending rearward from the cross slide 37. The projecting lengths of these cam styluses 42 and 44, that is, the positions of their tips, can be adjusted by their respective micrometers 42a and 44a respectively coupled thereto. Furthermore, the position of the large-diameter part 40a of the upper profiling cam 40 in the longitudinal direction is adjusted by a micrometer 40c provided on the left-hand side of the left-hand support arm 39.

A projecting member 36a is provided on the rear face of the aforedescribed saddle 36 and is adapted to be adjustably shiftable as desired along that rear face in the longitudinal direction. This projecting member 36a is also adapted, when moving in the longitudinal direction, to contact and move actuators $m_a$ and $m_b$ of limit switches $m_1$ and $m_2$ mounted at a predetermined distance apart and at predetermined positions on a fixed structural part thereby to cooperate with the actuators $m_a$ and $m_b$ to activate the limit switches $m_1$ and $m_2$. The resulting signals from these limit switches are used to cause the aforementioned electromagnetic brake 30, clutch 24a for cutting feed, and return clutch 25a to operate.

The cross slide 37 is similarly provided on its right-hand face with a projecting member 37a, which is adapted to activate limit switches $m_3$ and $m_4$. The resulting signals from the limit switch $m_3$ are used to cause the forward-rotation clutch 24a to operate and the limit switch $m_4$ is used for confirming the position of the cross slide 37.

Figure 3:
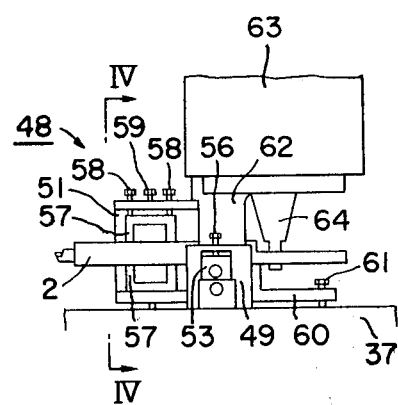
FIG. 3 is a front elevation of the cutting tool support parts.
Figure 4:
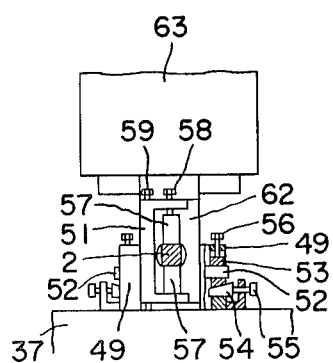
FIG. 4 is an elevation taken along the plane indicated by line IV—IV in FIG. 3 as viewed in the direction of the arrows.
Figure 5:
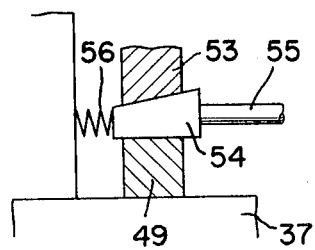
FIG. 5 is an enlarged fragmentary elevation showing the mounting of a wedge member shown in FIG. 4.

As shown in FIGS. 3 and 4, a tool rest 48 is mounted on the cross slide 37 and is provided with support frames 49 fixedly mounted thereon at positions spaced apart in the front-to-rear direction. On and between these support frames 49 is a tiltable frame 51 for supporting the cutting tool 2 and which is rotatably supported in a manner permitting its angle of tilt in its rocking or pitching direction to be adjusted. Outwardly extending trunnions 52 are fixed to the middle part of the tiltable frame 51 and are inserted into and rotatably supported by shiftable members 53, which are vertically slidable within the support frames 49. Each shiftable member 53 is supported, as shown in FIG. 5, on a wedge member 54, against the thicker end of which a rod 55 is abutting. A compression spring 56 is elastically pressing against the opposite thinner end of the wedge member 54.

Thus, by shifting each wedge member 54 by moving the rod 55 toward or away from the wedge member, the shiftable member 53 can be raised or lowered, whereby the vertical position of the corresponding trunnion (i.e., the vertical position of the center of the cutting tool 2) can be raised or lowered.

The left-hand end of the tiltable frame 51 has a channel-shaped cross section, and in the recessed part thereof, two channel-shaped frames 57 clamp the cutting tool 2 from above and below. The upper channel-shaped frame 57 is fixedly held by the tightening of two screws 58, to the rear of which a long screw 59 is passed through the tiltable frame 51 from the upper face to the bottom thereof and, extending to the cross slide 37, is abutting against its upper surface.

The tiltable frame 51 has on its right-hand end a tail part 60, which is provided with an adjusting screw 61 with its tip abutting against the upper surface of the cross slide 37. By adjustingly turning this adjusting screw 61 and the above described long screw 59, the angle of tilt of the tiltable frame 51 relative to the cross slide 37 can be adjusted and set.

Between the aforementioned support frames 49, a fixed frame 62 is fixedly supported on the cross slide 37. On this fixed frame, there is mounted an ultrasonic vibrator 63, below which is suspended a horn 64. The lower end of this horn 64 is coupled to the right-hand end (i.e., the end remote from the working end) of the cutting tool 2.

Figure 6:
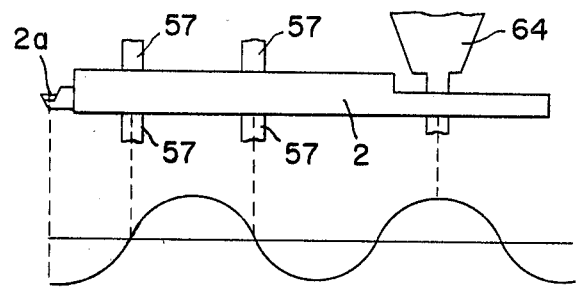
FIG. 6 is a combined side view of a cutting tool and a graph for a description of the states of vibration at various positions of the tool.

The point at which the cutting tool 2 and the horn 64 are thus coupled is positioned at a part of maximum amplitude of the vibration wave as indicated in FIG. 6, and the points at which the cutting tool 2 is clamped and fixed by the aforementioned channel-shaped frames 57 are positioned at points of zero amplitude. The cutting tip 2a of the cutting tool 2 is positioned at a point corresponding to the maximum amplitude.

Figure 7:
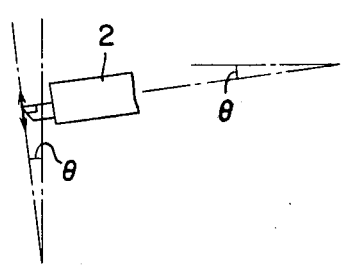
FIG. 7 is a fragmentary side view showing the cutting tool mounted in an inclined position.

The most desirable angular setting of the cutting tool 2 is that at which its angle of tilt is adjusted to equal the lead angle $\theta$ of the screw thread, as indicated in FIG. 7, by adjusting the titltable frame 51. By thus setting the angle of tilt of the cutting tool at the lead angle, the cutting tip of the tool is caused to vibrate in the direction of the screw thread in the case where a general bending vibration is used, and not only is the cutting resistance of the cutting tip reduced, but the cutting tip does not collide with the thread crests when it goes in the opposite direction to the cutting direction, even if the pitch of screw thread is very small.

Figure 8:
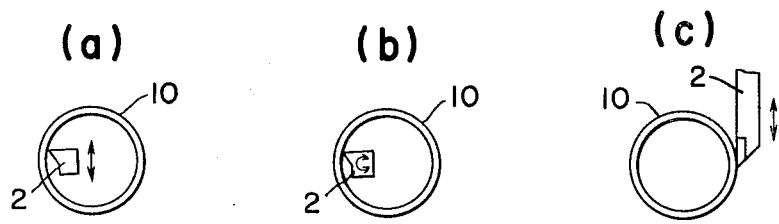
FIGS. 8(a), 8(b), and 8(c) are views for explaining the directions of vibration imparted to the cutting tool.

Furthermore, while the vibration is generally a bending vibration which causes the cutting tool to vibrate in the up-and-down directions, as indicated in FIG. 8(a), it may be a torsional vibration causing the cutting tool to vibrate in torsion, as indicated in FIG. 8(b), or a longitudinal vibration causing the cutting tool to vibrate in its longitudinal or elongational direction, as indicated in FIG. 8(c), used in instances such as that wherein male or external screw threads are cut.

The lathe of the above described construction and characteristic is operated in the following manner.

Prior to the actual screw cutting operation, the rotational speed of the longitudinal feed screw 34 is set in accordance with the pitch of the screw threads to be cut by adjustingly turning the levers 22 and 23 to set the gear ratios within the gear box 18. At the same time, the long screw 59 and the adjusting screw 61 are adjusted to impart a specific angle of tilt to the tiltable frame 51 thereby to set the cutting tool 2 at an angle of tilt equal to the lead angle of the screw thread to be cut.

Furthermore, in order to control the movements of the saddle 36 and the cross slide 37 in accordance with the diameter of the workpiece 10, the lengths of projection of the cam styluses 42 and 46 of the carriage control device 4 are adjusted by turning the micrometers 42a and 44a. The distance which the cutting tool moves away from the cutting surface in the direction perpendicular to the longitudinal axis of the workpiece after machining is adjusted by controlling the projecting length of the cam stylus 42, while the depth of cut of the screw is adjusted by controlling the projecting length of the cam stylus 44. Furthermore, in order to adjust the timing of movement of the cutting tool away from the workpiece after machining, the position of the large-diameter part 40a of the profiling cam 40 is adjusted by adjustingly turning the micrometer 40c.

FIG. 1 shows the state of the lathe wherein one screw cutting cycle (internal thread cutting) of a workpiece 10 held by the collet chuck 9 has been completed, and the next screw cutting cycle is going to start. In this state, the saddle 36 is moved furthest to the right. Before this, the push rod 16 moves toward the right and feeds the lowermost workpiece blank in the chute into the hollow interior of the main spindle 6. Just before the blank thus fed into the interior of the main spindle strikes against the workpiece 10, the screw cutting operation on which has already been completed, the air cylinder 15 contracts to open the collet chuck 9. The newly fed blank then strikes the already machined workpiece 10, which is thereby dislodged from the collet chuck 9. At the same time, the new blank stops within the hollow space in the collet chuck 9.

At this time, the air cylinder 15 elongates slightly, thereby tightening the collet chuck 9, which thereby positively holds the blank. After these actions, the cross slide 37 assumes the position $P_1$ furthest to the right in FIG. 9, and the projection 37a of the cross slide 37 actuates the limit switch $m_4$ to cause the return clutch 24a to be disengaged and electromagnetic brake 30 to actuate thereby to stop the longitudinal feed screw 34. At this time, in order to tighten the collet chuck 9 in which the blank is held, the air cylinder 15 elongates to cause the rod 15a thereof to actuate the microswitch $m_5$. By the acutation of the microswitch $m_5$, the air cylinders 38 are elongated to cause the cross slide 37 to move from the position $P_1$ to the position $P_2$ (FIG. 9).

The travel of the cross slide 37 stops when the cam stylus 44 comes into contact with the lower cam 41. At this time, the projection 37a on right-hand face of the cross slide 37 actuates the limit switch $m_3$, which thereupon causes the brake 30 to be released and the forward-rotation clutch 24a to be engaged. As a result, the longitudinal feed screw 34 rotates in the forward direction at the present speed, and the saddle 36 travels toward the left or in the screw cutting direction. When the cutting tip 2a of the tool 2 contacts the inner surface of the right-hand end of the workpiece 10, the screw cutting begins.

Figure 9:
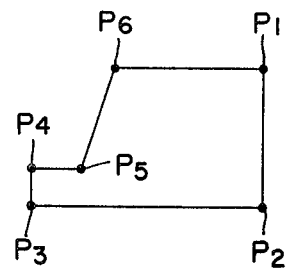
FIG. 9 is a plan view showing the path of travel of the cross slide of the lathe.

Then, when the prescribed screw cutting has been completed, and the cross slide 37 advances to the position $P_3$ shown in FIG. 9, the limit switch $m_2$ is actuated to operate the electromagnetic brake 30 and, at the same time, to cause the forward-rotation clutch 25a to become disengaged and air cylinder 38 to be shortened. Then, the cross slide 37 is caused to move slightly rearward to clear the cutting tool from the machined surface. At this time, the cross slide 37 has reached the position $P_4$. While the cross slide 37 moves from the position $P_5$ to $P_1$, a new workpiece is supplied in the chuck 9 as mentioned before.

During the leftward advance of the saddle 36, the cam stylus 44 slides along the lower cam 41, but at this time the cam stylus 42 moves in the transverse direction while being slightly separated from the large-diameter part 40a of the upper cam 40 and, when the air cylinder 38 is shortened, contacts the large-diameter part 40a thereby to move slightly the cutting tool away from the machined surface.

At the time the cutting tool is being cleared from the machined surface, the reverse-rotation clutch 25a is engaged via delay circuit, and the saddle 36 retracts toward the right, and the cam stylus 42 slides along the large-diameter part 40a of the cam 40. Then, when the cross slide 37 reaches the position $P_5$, the cam stylus 42 descends along the inclined face 40d of the cam 40 and reaches the small-diameter part 40b thereof. At this time, the cross slide 37 travels from the position $P_5$ to the position $P_6$ and thereafter, guided by the contact between the cam stylus 42 and the small-diameter part 40b of the cam 40, returns to the state as indicated in FIG. 1.

The position $P_5$ of the cross slide 37 is set to correspond to the position where the tip of the cutting tool has moved rightward beyond the right end of the outer end of the workpiece 10.

During the screw cutting operation, the cutting tip of the cutting tool, to which bending vibration is being imparted by the ultrasonic vibrator 63, vibrates in the lead direction (i.e., the cutting direction) of the screw threads. For this reason, the cutting resistance becomes remarkably low, and accurate screw cutting becomes possible. Furhermore, because of this remarkable reduction in the cutting resistance, the saddle 36, cross slide 37, profile cams 40 and 41, and cam styluses 42 and 44 are not required to have great rigidity, and, moreover, low driving power is sufficient for driving the saddle 36 and the cross slide 37. Further advantageous results are that the gripping force of the collet chuck 9 can be reduced, that the serviceable life of the cutting tool is greatly prolonged, and the entire machine can be made to have a small bulk.

While the above description relates to the case where screw cutting was carried out on the inner surface of a workpiece, the lathe according to this invention is also capable of performing screw cutting on the outer surface of a workpiece by a similar process.

Similarly as in conventional machining, the traveling movements of the saddle and the cross slide of the lathe of this invention can be carried out by a system such as a hydraulic copying system or a cam lever feed system, and numerical control or program control can be carried out with the use of servomotors (pulse motors or DC motors).

In order to indicate more fully the nature and utility of this invention, the following machining examples and comparison examples are set forth, it being understood that these examples are presented as illustrative only and that they are not intended to limit the scope of the invention.

Machining Example 1

Screw threads were cut on the following blank material by means of the lathe of this invention.
  Material: Stainless steel, Japanese Industrial Standards (JIS) designation SUS 304.
  Hardness: (Hv) 200 to 300.
  Outer diameter: 8.4 mm.
  Inner diameter: 7.7 mm.
  Wall thickness: 0.35 mm.
  Shape: Thin-wall hollow cylinder.
  The particulars of the screw threads (male or external threads) were as follows.
  Pitch: 0.75 mm.
  Height of thread: 0.13 mm.
  Bottom width of thread: 0.3 mm.
  Screw length: 5 mm.
  Thread angle: 60 degrees.
  The operating conditions of the lathe were as follows.
  Cutting tool bending vibration frequency: 20,000 Hz
  Cutting tip amplitude of cutting tool undergoing bending vibration: 1.5 $\mu$m
  Cutting tool vibration velocity: 113 m./min.
  Cutting tool tip material: UF 10 (Mitsubishi Kinzoku K.K. brand designation: Super hard tip)
  Rotational speed of main spindle: 500 rpm.

Workpiece cutting speed: 2.5 m./min.
Cutting fluid: Cutting oil.
Cutting cycle period: 6 seconds.

As a result, with one screw cutting cycle, the workpiece was threaded without any burrs, deformation of the workpiece, or damaging of the threads and without wear of the cutting tool tip, which thus performed screw cutting of 10,000 workpieces before requiring regrinding for reuse.

Machining Example 2

Under the conditions of Machining Example 1, metricsystem threads of 20-mm. length and a 0.5-mm. pitch in one instance and a 0.75-mm. pitch in another were cut on the outer surface and inner surface of tubular workpiece blanks made of stainless steel and each having a 60-mm. outer diameter, a 50-mm. inner diameter, and a 5-mm. wall thickness. As a result, with one cutting cycle, workpieces of the desired shape and dimensions were obtained. The tip of the bending vibration cutting tool showed no wear.

For comparison, the following conventional screw cutting was carried out.

Comparison Example 1

Conventional screw cutting was carried out on the blank of Machining Example 1 to cut the same threads as in Machining Example 1 with the use of a super-hard tip M10 (JIS designation) as the cutting tool tip under the conditions of a main spindle rotational speed of 100 rpm and a cutting speed of 2.5 m/min. As a result, with one screw cutting cycle of 0.13 mm, the tip of the cutting tool was greatly worn, and the screw threads were crushed, whereby threading to the specified shape and dimensions could not be accomplished.

Comparison Example 2

Conventional screw cutting was carried out on the same blank as in Machining Example 1 to cut the same threads as in Machining Example 1 with the use of a superhard tip M10 as the cutting tool tip under the conditions of a main spindle rotational speed of 100 rpm and a cutting speed of 2.5 m/min. As a result, by cutting to a depth of 0.18 mm with 7 screw cutting cycles, screw threads of the specified shape and dimensions were at last obtained. However, the cutting tool tip began to wear from the first workpiece and was severely worn after 40 to 50 workpieces had been machined, and threads of the specified shape and dimensions could no longer be cut. The cutting cycle period at this time was approximately 30 seconds.

Comparison Example 3

The same screw threads as in Machining Example 2 were cut on workpiece blanks of the material and shape in Machining Example 2 by the conventional cutting procedure, whereupon with one cycle of cutting, a part of the cutting tool tip was chipped, and burrs were also formed. As a consequence, screw cutting to the specified shape and dimensions could not be accomplished.

It will be apparent from comparison of the results of the above machining examples and comparison examples that the performance of the lathe of this invention in screw cutting a workpiece is remarkably better than that of a lathe carrying out conventional screw cutting.

What is claimed is:

1. A vibration threading lathe for precision screw cutting, comprising:
   a main spindle having a hollow interior and a chuck at one end thereof;
   a blank feeding device for feeding blanks one-by-one through said hollow spindle from the other end and to said chuck to be held thereby at said one end of said main spindle;
   means for rotatably driving said main spindle;
   a travelling carriage assembly on said lathe adjacent said one end of said main spindle and having a saddle mounted thereon for movement in the axial direction of said main spindle, means connected with said saddle for moving said saddle toward said main spindle at a speed corresponding with the pitch of the screw threads being cut, a cross slide mounted on said travelling carriage for movement perpendicular to the direction of movement of said saddle, and carriage control means for controlling the movement of said saddle and said cross slide;
   a tool rest mounted on said cross slide and having a tiltable frame;
   a cutting tool mounted in said tiltable frame, said tiltable frame being adjustably mounted on said tool rest for adjustment of the position thereof relative to said tool rest for varying the position of the cutting tip of the cutting tool relative to a blank held in said chuck; and
   a vibrator mounted on said cross slide and coupled to said cutting tool for causing said cutting tool to vibrate during the screw cutting operation thereof.

2. A vibration threading lathe as claimed in claim 1 in which said vibrator is an ultrasonic vibrator for imparting to said cutting tool at least a bending move of vibration for causing the cutting tip of said cutting tool to vibrate in a direction perpendicular to the axis thereof.

3. A vibration threading lathe as claimed in claim 2 in which said tiltable frame is tiltable to a position where the cutting tip of said cutting tool is inclined to the axis of said main spindle at an angle equal to the lead angle of the screw thread being cut and is movable in the up and down direction for adjusting the position of said cutting tool in the up and down direction.

4. A vibration threading lathe as claimed in claim 3 in which said tiltable frame has cutting tool support means at positions corresponding to the nodal positions of said cutting tool in the longitudinal direction of said cutting tool where the amplitude of the vibration wave is zero, and the cutting tip of said cutting tool being at a position of maximum amplitude of the vibration wave.

5. A vibration threading lathe as claimed in claim 4 in which said carriage control means comprises first and second control means each having a cam on said saddle and a cam follower on said cross slide, said first control means consituting a cutting control mechanism for controlling movement of said cutting tool during the screw cutting, and the second control means constituting a return control mechanism for controlling movement of said cutting tool during return to a start position after completion of the screw cutting.

6. A vibration threading lathe as claimed in claim 4 further comprising a gear box connected to said main spindle for transmitting the rotation of said main spindle, a longitudinal feed screw connected to said saddle and to which said gear box is connected, and a forward rotation clutch and a reverse rotation clutch connected between said gear box and said feed screw and alternately operable to change the rotational direction of said longitudinal feed screw.

7. A vibration threading lathe as claimed in claim 6 further comprising limit switches actuated in response to the movements of the travelling carriage assembly and connected to said clutches for actuating said clutches.

8. A vibration threading lathe as claimed in claim 7 in which means for driving said cross slide is provided which comprises at least one air cylinder mounted on said saddle, and further limit switches actuated in response to the movements of said travelling carriage assembly for actuating said air cylinder.

* * * * *